US006946952B2

(12) United States Patent
Preishuber-Pfluegl et al.

(10) Patent No.: US 6,946,952 B2
(45) Date of Patent: Sep. 20, 2005

(54) DATA CARRIER FOR TRANSMITTING DATA WITH DIFFERENT TRANSMISSION PARAMETERS

(75) Inventors: Josef Preishuber-Pfluegl, Graz (AT); Franz Amtmann, Graz (AT)

(73) Assignee: Koninklijke Philips Electronics N.V., Eindhoven (NL)

(*) Notice: Subject to any disclaimer, the term of this patent is extended or adjusted under 35 U.S.C. 154(b) by 271 days.

(21) Appl. No.: 10/294,404

(22) Filed: Nov. 13, 2002

(65) Prior Publication Data

US 2003/0095035 A1 May 22, 2003

(30) Foreign Application Priority Data

Nov. 16, 2001 (EP) .......................................... 01000637

(51) Int. Cl.[7] .................................................. H04Q 5/22
(52) U.S. Cl. ...................... 340/10.4; 340/10.1; 342/44; 342/50; 342/51
(58) Field of Search ............................. 340/10.4, 10.1; 342/44, 50, 51

(56) References Cited

U.S. PATENT DOCUMENTS 5,485,154 A   1/1996   Brooks et al. ................. 342/44
5,539,394 A   7/1996   Cato et al. .............. 340/825.54

FOREIGN PATENT DOCUMENTS

| WO | WO9832092  | 1/1998  | ............ G06K/7/10 |
| WO | WO9965168  | 5/1999  | ............ H04J/3/00 |
| WO | WO 9965168 | 12/1999 | ............ H04J/3/00 |

Primary Examiner—Michael Horabik
Assistant Examiner—Matsuichiro Shimizu
(74) Attorney, Agent, or Firm—Kevin Simons

(57) ABSTRACT

A data carrier (1) for contactless communication with the communication station comprises firstly a reception stage (3) for receiving an interrogation signal (IS), secondly a generation stage (17) for generating a response signal (RS) upon reception of the interrogation signal (IS), thirdly a processing circuit (18) for processing the response signal (RS) into a transmission signal (MCRS) suitable for transmission to the communication station, fourthly a determination device (22) for determinating at least one representative value (REP1, REP2), the representative value (REP1, REP2) representing the field strength of the field acting on the data carrier (1), and fifthly a control connection (25) between the determination device (22) and the processing circuit (18), wherein the processing circuit (18) is influenced via the control connection (25) in order to vary a transmission parameter of a transmission signal generated by the processing circuit (18) as a function of the at least one representative value (REP1, REP2).

12 Claims, 4 Drawing Sheets

DATA CARRIER FOR TRANSMITTING DATA WITH DIFFERENT TRANSMISSION PARAMETERS

FIELD OF THE INVENTION

The invention relates to a data carrier which is intended and designed for contactless communication with a communication station and for this purpose has rece station and can be transmitted to the data carrier in a contactless manner by a field produced by the communication station and acting on the data carrier, the data carrier having generating means for generating a response signal upon reception of the interrogation signal and processing means for processing the response signal, the processing means processing the response signal into a transmission signal suitable for transmission to the communication station, and in which processing means at least one transmission parameter of the transmission signal can be varied.

The invention further relates to a circuit for a data carrier for contactless communication with the communication station, the circuit containing connection means for receiving an interrogation signal and generating means for generating a response signal upon reception of the interrogation signal and processing means for processing the response signal.

The invention further relates to a communication station for contactless communication with a data carrier according to the design described in the first paragraph above.

BACKGROUND

A data carrier according to the design described in the first paragraph above and a circuit according to the design described in the second paragraph above are disclosed, for example, in the patent document WO 99/65168 A2. The known data carrier with the known circuit has a design in which the processing means for processing the response signal are formed in a plurality of different time windows and in which that time window in which the known data carrier generates its transmission signal formed from the response signal and transmits it to a communication station is determined as a function of a portion of the serial number significant for this data carrier.

With regard to a data carrier in which the processing means are designed to process a response signal in a plurality of time windows, reference may also be made to the patent document U.S. Pat. No. 5,539,394 A, which in the aforementioned patent document WO 99/65168 A2 is acknowledged as the state of the art. In the data carriers disclosed by the two patent documents WO 99/65168 A2 and U.S. Pat. No. 5,539,394 A cited above, processing means are provided in which the onset point of time windows during which the transmission signal to be transmitted from the data carrier to the communication station can be transmitted to a communication station is selected as a variable transmission parameter.

However, a subcarrier signal may also be selected as the variable transmission parameter, the relevant data carrier then being designed to generate different subcarrier signals and preferably to generate subcarrier signals differing in respect of their subcarrier frequency, and the subcarrier signals differing in respect of their subcarrier frequency being used for the modulation of a response signal for the purpose of generating a transmission signal suitable for transmission to a communication station. Reference may be made, in this context, to the patent document U.S. Pat. No. 5,485,154 A.

Common to all the known data carriers mentioned above is the fact that the generation of response signals and hence of transmission signals is dependent only on portions of a serial number or of random numbers or of other memory contents stored in a memory of the known data carrier. In the case of the known data carriers, this means that, with a plurality of data carriers present in a communication range of a communication station, it can happen relatively frequently that two data carriers transmit their transmission signal to a communication station using the same transmission parameters, for example using the same time window, one of two such data carriers possibly being situated relatively close to a communication station and the other data carrier relatively far away from the communication station, and the problem then arising that the data carrier situated relatively close to the communication station transmits a relatively strong transmission signal to the communication station, whereas the data carrier situated relatively far away from the communication station transmits only a relatively weak transmission signal to the communication station, which may and unfortunately often does mean that the transmission signal of the data carrier situated relatively close to the communication station masks the transmission signal of the data carrier situated relatively far away from the communication station, so that the data carrier situated relatively far away from the communication station is then not detected by the communication station and cannot be further processed, for example selected, read out, or written to when the need subsequently arises. This state of affairs may lead to a failure situation or give rise to high costs, incurred in detecting all data carriers situated in a communication range of a communication station in order to avoid such a failure situation.

SUMMARY

It is an object of the invention to avoid the difficulties cited above and to provide an improved data carrier, an improved circuit for a data carrier, and an improved communication station, with which data carriers the swiftest and most flawless interrogation and detection of each data carrier is assured at all times virtually regardless of their distance from a communication station, and without this incurring high costs.

The aforementioned object is achieved in a data carrier according to the invention by the provision of features according to the invention, so that a data carrier according to the invention may be characterized in the following way:

Data carrier for contactless communication with a communication station, the data carrier comprising the means listed below, viz: reception means for receiving an interrogation signal which can be generated by a communication station and can be transmitted to the data carrier in a contactless manner by a field produced by the communication station and acting on the data carrier, and generating means for generating a response signal upon reception of the interrogation signal and processing means for processing the response signal, the processing means being designed to process the response signal into a transmission signal suitable for transmission to the communication station, in which processing means at least one transmission parameter of the transmission signal can be varied, and determination means for determinating at least one representative value which represents the field strength of the field acting on the data carrier, and control connection means between the determination means and the processing means, the control connection means being designed to controllably influence the processing means as a function of the at least one representative value, i.e. to vary at least one transmission parameter of the transmission signal as a function of the at least one representative value.

The aforementioned object is achieved in a circuit according to the invention by the provision of features according to the invention, so that a circuit to the invention may be characterized in the following way:

Circuit for a data carrier for contactless communication with a communication station, the circuit comprising the means listed below, viz: connection means for receiving an interrogation signal which can be generated by a communication station and can be transmitted to the data carrier and hence to the circuit for the data carrier in a contactless manner by a field produced by the communication station and acting on the data carrier, and generating means for generating a response signal upon reception of the interrogation signal and processing means for processing the response signal, the processing means being designed to process the response signal into a transmission signal suitable for transmission to the communication station, in which processing means at least one transmission parameter of the transmission signal can be varied, and determination means for determinating at least one representative value, which represents the field strength of the field acting on the data carrier, and control connection means between the determination means and the processing means, the control connection means being designed to controllably influence the processing means as a function of the at least one representative value, i.e. to vary at least one transmission parameter of the transmission signal as a function of the at least one representative value.

Providing the features according to the invention ensures that, by simple means and at only a small additional cost, the transmission signal suitable for transmission to a communication station is formed as a function of the at least one representative value representing the field strength of the field acting on a data carrier according to the invention. This readily allows data carriers, which are situated relatively close to a communication station and consequently generate a representative value representing a high field strength, to be operative in a predetermined range of a transmission parameter, whereas other data carriers according to the invention, which are situated relatively far away from a communication station and accordingly generate a representative signal corresponding to a relatively weak field strength, are operative in another range of a transmission parameter. This ensures that data carriers which are exposed to different field strengths always generate their transmission signal in different ranges of a variable transmission parameter, which means that only those data carriers which are exposed to essentially the same field strength can be operative in a range of a variable transmission parameter, so that any masking effect like that possible in the case of known data carriers is prevented in the case of data carriers according to the invention.

It has proved particularly advantageous, in a data carrier according to the invention and in a circuit according to the invention, if the features as claimed in Claim 2 and Claim 7, respectively, are additionally provided. Such an embodiment is particularly advantageous because, where required, the control means capable of generating control data will permit a highly diversified control of the processing means as a function of at least one representative value. It should be mentioned at this point, however, that in the simplest case it will also be possible to manage without the provision of control means, control connection means formed by simple electrical or electronic connections then being provided between the determination means and the processing means, with the aid of which control connection means control commands emitted by the determination means can be fed directly to the processing means.

It has proved advantageous, in a data carrier according to the invention or in a circuit according to the invention, if the features as claimed in Claim 3 or Claim 8, respectively, are additionally provided. Such an embodiment affords the advantage that a response signal is processed into a transmission signal in a time window commencing at a specific onset point as a function of that field strength to which a data carrier according to the invention having a circuit according to the invention is exposed.

It has also proved advantageous, in a data carrier according to the invention or a circuit according to the invention, if the features as claimed in Claim 4 and Claim 9, respectively, are additionally provided. This represents a simple way of ensuring that the method of coding implemented in processing a response signal into a transmission signal is selected as a function of at least one representative value, so that the particular method of coding selected varies as a function of the field strength acting on a data carrier according to the invention having a circuit according to the invention.

It has also proved highly advantageous, however, in a data carrier according to the invention or in a circuit according to the invention, if the features as claimed in Claim 5 and Claim 10, respectively, are additionally provided. Such an embodiment affords the advantage that the subcarrier signal, which may be necessary for processing a response signal into a transmission signal, can be adapted in respect of its subcarrier frequency to at least one representative signal and consequently to the field strength acting on a data carrier according to the invention having a circuit according to the invention.

The aforementioned object is achieved in a communication station according to the invention by the provision of features according to the invention, so that a communication station according to the invention may be characterized in the following way:

Communication station for contactless communication with a data carrier, the data carrier being designed for contactless communication with the communication station and comprising the means listed below, viz: reception means for receiving an interrogation signal which can be generated by the communication station and can be transmitted to the data carrier in a contactless manner by a field produced by the communication station and acting on the data carrier, and generating means for generating a response signal upon reception of the interrogation signal and processing means for processing the response signal, the processing means being designed to process the response signal into a transmission signal suitable for transmission to the communication station, in which processing means at least one transmission parameter of the transmission signal can be varied, and determination means for determinating at least one representative value which represents the field strength of the field acting on the data carrier, and control connection means between the determination means and the processing means, the control connection means being designed to controllably influence the processing means as a function of the at least one representative value, i.e. to vary at least one transmission parameter of the transmission signal as a function of the at least one representative value, wherein the communication station comprising the means listed below, viz: command signal generating means for generating command signals, and reception means for receiving the transmission signal transmitted from the data carrier to the communication station, and processing means for processing the transmission signal received, and transmission parameter detection means for detecting the transmission parameter of the transmission signal received, and decision means which interact with the transmission parameter detection means and which are intended and designed to decide on the generation of at least one command signal as a function of the transmission parameter of the received transmission signal detected by the transmission parameter detection means.

Provision of the features according to the invention in a communication station according to the invention is a simple way of ensuring, at only a small additional cost, that the generation of specific command signals is permitted or enabled by the decision means only when that data carrier responsible for originating the command signals to be generated is exposed to a field strength in excess of a specific minimum field strength as determined by the determination means in the data carrier and expressed by the representative value generated in the data carrier, said representative value having ultimately influenced the transmission parameter of the transmission signal from the data carrier to the communication station. This readily and advantageously ensures, for example, that in access control systems having a communication station according to the invention, an access clearance command signal for a door, for example, is generated by a host computer of the access control system only if the access control data carrier is in close proximity to the communication station.

It has proved particularly advantageous, in a communication station according to the invention, if the features as claimed in Claim 12 are additionally provided. This represents a simple and advantageous way of allowing a so-called write command signal for a data carrier to be generated by the command signal generating means of the communication station according to the invention only if the relevant data carrier is sufficiently close to the communication station and is accordingly exposed to a relatively high field strength, and is a consequently supplied with a relatively high power. This is also a simple way of ensuring that so-called security functions in a data carrier, which are relatively computer-bound and consequently require much power, are activated by a corresponding command signal in a data carrier only if the relevant data carrier is close enough to the communication station according to the invention and is supplied with sufficient power thereby.

The aforementioned aspects and other aspects of the invention will become apparent from the embodiments described below and will be explained with reference to these embodiments

BRIEF DESCRIPTION OF THE DRAWINGS

The invention will be further described with reference to embodiments shown in the drawings to which, however, the invention is not restricted.

DETAILED DESCRIPTION

Figure 1:
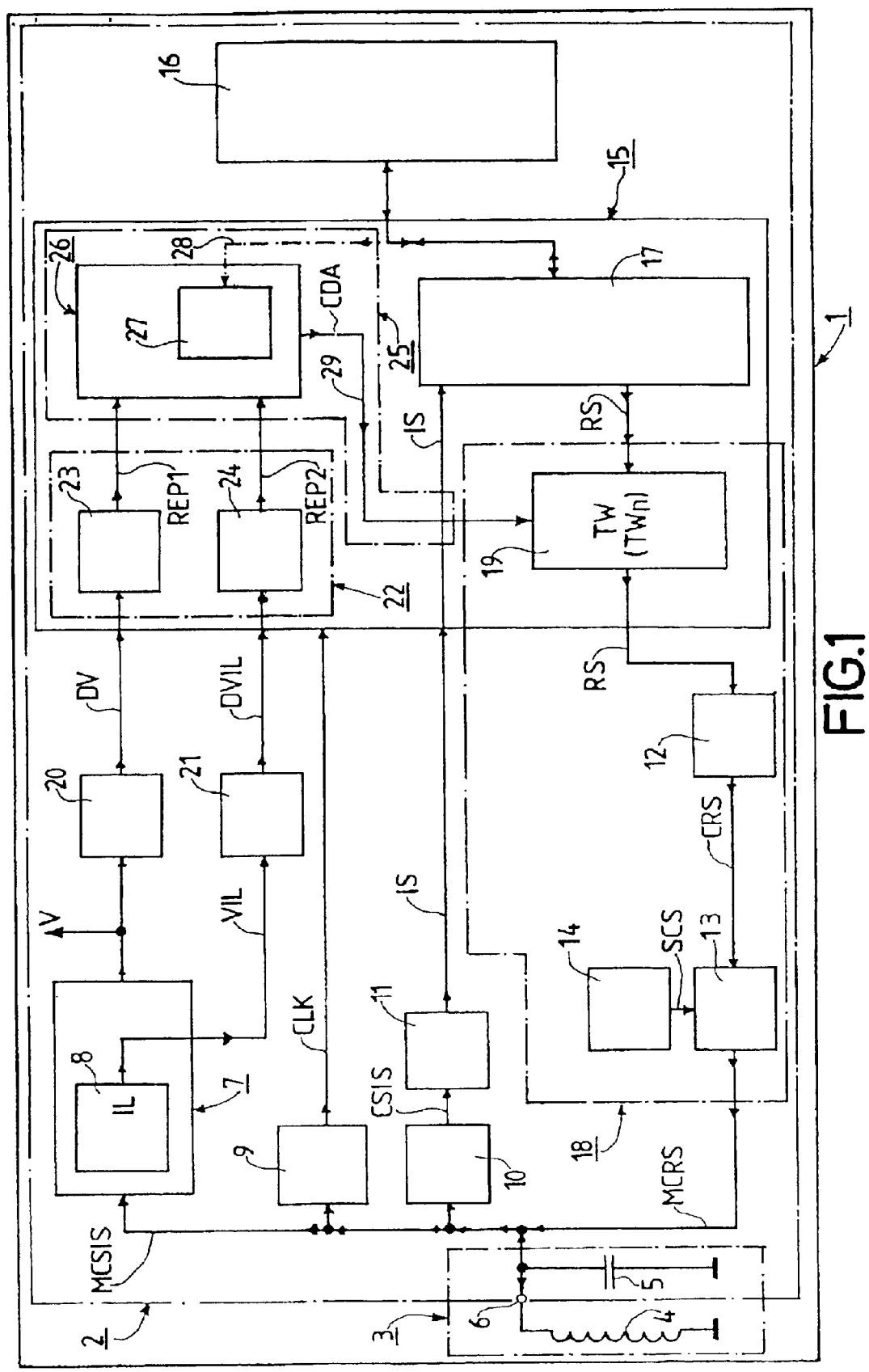
FIG. 1 is a schematic representation in the form of a block circuit diagram of what is, in this context, an essential part of a data carrier and a circuit for this data carrier in a first embodiment of the invention.

FIG. 1 shows a data carrier 1 having a circuit 2 for the data carrier 1 in a first embodiment the invention. The circuit 2 is an integrated circuit. The data carrier 1 is intended and designed for contactless communication with a communication station not represented in FIG. 1. The data carrier 1 is in this case a data carrier 1 which is connected to a product and in which data relating to the product are stored, for example data relating to the product type, the sales price, the date of manufacture, an expiry date, and similar characteristics. The data carrier 1 may also be intended and designed for other applications, however. By means of the said communication station it is possible, where required, to retrieve the data stored in the data carrier 1 through contactless communication between the data carrier 1 and the communication station. For a flawless performance of such contactless communication, the communication station must be capable of flawlessly detecting the data carrier 1 in order to be able to process the data carrier 1 further, for example to write to or read out from the data carrier, and in many applications must also be capable of selecting from a number of such data carriers. For flawless detection of a data carrier 1 using a communication station, the data carrier 1 has a series of means, which will be examined in more detail below. It should be mentioned that FIG. 1 shows only those means which are of significance in the present context. The data carrier 1 contains a number of other means which are not examined further here.

The data carrier 1 has transmission means 3 which form both reception means and transmitter means. The transmission means 3 comprise a transmission coil 4, which is provided outside the circuit 2, and a capacitor 5, which is incorporated in the circuit 2. The transmission coil 4 is connected to a contact terminal 6 of the circuit 2, the contact terminal 6 forming an integral part of connection means of the circuit 2. The transmission coil 4 and the capacitor 5 form a resonant circuit, the resonance frequency of which corresponds to a working frequency of at least one signal to be transmitted to the data carrier 1 from the communication station. In this instance, a signal to be transmitted to the data carrier 1 is an amplitude-modulated carrier signal MCSIS. It may, however, be some other form of transmission signal.

The transmission means 3, which form reception means, are intended and designed to receive an interrogation signal IS, this interrogation signal IS being contained in the amplitude-modulated carrier signal MCSIS. The interrogation signal IS can be generated by the communication station (not shown) and can be transmitted to the data carrier 1 in a contactless manner by a field produced by the communication station and acting on the data carrier 1. In this instance transmission is by inductive means, i.e. by a transformer. However, transmission may alternatively be by electromagnetic means. The interrogation signal IS requests the data carrier 1 or a number of data carriers 1 present in a communication range of the communication station to report to the communication station, i.e. to transmit a response signal to the communication station.

The data carrier 1 and the circuit 2 comprise a power supply circuit 7 comprising a limiting stage 8, a clock pulse regeneration stage 9, and a demodulation stage 10. The power supply circuit 7 and the clock pulse regeneration stage 9 and the demodulation stage 10 are each connected to the contact terminal 6, with the result that the modulated carrier signal MCSIS is fed to each of these circuit components.

The power supply circuit 7 is intended and designed to generate a supply DC voltage V using the amplitude-modulated carrier signal MCSIS fed to it, as has long been known in the art. The power supply circuit 7 comprises a limiting stage 8 by means of which the supply DC voltage V generated can be limited to a specific value. The provision of such a limiting stage 8 in such a data carrier 1 or in the power supply circuit 7 of such a data carrier 1 has also long been known. As a result of its limiting function, a limiting current IL occurs in the limiting stage 8, as is indicated symbolically in FIG. 1.

The clock signal regeneration stage 9 is intended and designed for the regeneration of a clock signal CLK using the amplitude-modulated carrier signal MCSIS. This measure, too, has long been known.

The demodulation stage 10 is intended and designed for demodulation of the amplitude-modulated carrier signal MCSIS. The amplitude-modulated carrier signal MCSIS can be fed to the demodulation stage 10, with the result that the demodulation stage 10 can generate and deliver a demodulated carrier signal CSIS. A decoding stage 11, to which the demodulated carrier signal CSIS can be fed and by means of which this still encoded signal can be decoded, is connected to the output side of the demodulation stage 10. This signal has previously been coded in the communication station (not shown). After decoding, the decoding stage 11 emits the interrogation signal IS.

The means hitherto described come into operation when the data carrier 1 is in a reception mode. With the data carrier 1, however, a transmit mode or a transmission mode from the data carrier 1 to the communication station is also feasible. For this purpose the data carrier 1 or the circuit 2 comprises a coding stage 12 and a modulation stage 13 connected to the output side of the coding stage 12, and a subcarrier signal generator 14 which is connected to the modulation stage 13. The modulation stage 13 is connected on the output side to the contact terminal 6 and hence to the transmission means 3, which also form transmitter means. A response signal RS, the generation of which will be examined in more detail below, can be fed to the coding stage 12. By means of the coding stage 12 it is possible to code the response signal RS, the coding stage 12 emitting a coded response signal CRS after coding. The coded response signal CRS can be fed to the modulation stage 13. A subcarrier signal SCS generated by means of the subcarrier signal generator 14 can also be fed to the modulation stage 13. The modulation stage 13 performs an amplitude modulation of the coded response signal CRS using the subcarrier signal SCS, so that the modulation stage 13 delivers an amplitude-modulated and coded response signal MCRS to the transmission means 3, the transmission means 3 providing for transmission to the communication station. Instead of an amplitude modulation, however, a phase modulation or a frequency modulation may also be performed.

The data carrier 1 and the circuit 2 of the data carrier 1 comprises a microcomputer 15. A hard-wired logic circuit may alternatively be provided instead of the microcomputer 15, however. Storage means 16, which contain a RAM, a ROM, and an EEPROM, interact with the microcomputer 15, as has long been known. The microcomputer 15 provides data processing means 17. The data processing means 17 serve for processing a received interrogation signal IS and further serve for generating a response signal RS upon reception of an interrogation signal IS or in response to a received interrogation signal IS. In addition to a number of other means (not shown), therefore, the data processing means 17 also form generating means 17 for generating a response signal RS in response to a received interrogation signal IS. The response signal RS is generated from data which are contained in the storage means 16 and are characteristic of the data carrier 1.

The data carrier 1 and the circuit 2 furthermore contain processing means 18 for processing the response signal RS. The processing means 18 process the response signal RS into a transmission signal suitable for transmission to the communication station 1, i.e. into the modulated and coded response signal MCRS. A transmission parameter of the transmission signal can be varied in the processing means 18. In this instance the processing means 18 for processing the response signal RS are formed in a total of sixty-four (64) time windows TW beginning at sixty-four (64) different onset points, as is indicated symbolically in FIG. 1. It is also possible, however, to select a different number of time windows beginning at various onset points, for example thirty-two (32) or one hundred and twenty-eight (128) or two hundred and fifty-six (256), or alternatively some number which is not a multiple of two (2). In order to define the time windows TW beginning at sixty-four (64) different onset points, the processing means 18 have time window defining means 19 which in this instance are provided by the microcomputer 15. The response signal RS generated by the data processing means 17 can be fed to the time window defining means 19, and the time window defining means 19 subsequently define a specific time window TWn in which the response signal RS is relayed to the coding stage 12. It should be further mentioned that the processing means 18 comprise the time window defining means 19, the coding stage 12, the modulation stage 13, and the subcarrier signal generator 14.

A first analog/digital converter 20 and a second analog/digital converter 21 are provided in the data carrier 1 and the integrated circuit 2. The first analog/digital converter 20 is connected on the input side to the output of the power supply circuit 7, so that a first digital value DV representative of the supply DC voltage occurring at this output can be generated by the first analog/digital converter 20. A voltage VIL proportional to the limiting current IL occurring in the limiting stage 8 can be fed to the second analog/digital converter 21, so that a second digital value DVIL representative of this voltage VIL and consequently of the limiting current IL can be generated by the second analog/digital converter 21.

By means of the microcomputer 15 determination means 22 being realized to which determination means the first digital value DV and the second digital value DVIL can be fed. The determination means 22 are intended and designed to determinate two representative values REP1 and REP2, which representative values REP1 and REP2 each represent the field strength of the field acting on the data carrier 1. The determination means 22 comprise a voltage value determination stage 23 and current value determination stage 24. Using the first digital value DV, the voltage value determination stage 23 generates the first representative value REP1, which bears a relation to the supply DC voltage V. Using the second digital value DVIL the current value determination stage 24 generates the second representative value REP2, which bears a relation to the limiting current IL in the limiting stage 8. By virtue of the relationships existing, the two representative values REP1 and REP2 represent the field strength of the field acting on the data carrier 1, so that the data carrier 1 through the two representative values REP1 and REP2 contains information which indicates the level of the field strength acting on the data carrier 1 and hence the distance of the data carrier 1 from the communication station.

Control connection means 25 are advantageously provided between the determination means 22 and the processing means 18 in the data carrier 1 and in the integrated circuit 2, respectively. By way of the control connection means 25 it is possible to exert a controlling influence on the processing means 18 as a function of the two representative values REP1 and REP2. The controlling influence exerted on the processing means 18 is here intended to vary at least one transmission parameter of the transmission signal as a function of the two representative values REP1 and REP2. In this example the onset point of the time window TW forms the variable transmission parameter, i.e. in this example the sixty-four (64) onset points for the total of sixty-four (64) time windows TW can be defined as a function of the two representative values REP1 and REP2.

In the control connection means 25 in the data carrier 1 and the circuit 2, respectively, control means 26 are provided, which interact with the determination means 22, to which the two representative values REP1 and REP2 can be fed, which are designed to generate control data CDA as a function of the two representative values REP1 and REP2, and which interact with the processing means 18 in order to vary the—in this example—one transmission parameter by means of the generated control data CDA generated.

The control means 26 comprise a data generator 27, which in this case takes the form of a random number generator. The random number generator is intended to generate random numbers by means of which it is possible to influence the selection of a time window, i.e. the onset point of a time window. The data generator 27 may also be of a design, however, in which the so-called serial number of the data carrier 1 is fed to the data generator 27 from the storage means 16 via a diagrammatically indicated connection 28 and in which the data generator, from the serial number fed to it, generates data, by means of which the selection of a time window, i.e. of the onset point of a time windows, can be influenced. Using the two representative values REP1 and REP2 and using the random number generated by the random number generator 27, the control means 26 can generate control data CDA which can be fed from the control means 26 via a connection 29 to the time window defining means 19. It is possible to define the onset point of a time window TWn by means of the control data CDA, in which time window TWn the response signal RS generated by the data processing means 17 is relayed to the coding stage 12, and the modulated and coded response signal MCRS is subsequently transmitted from the data carrier 1 to the communication station 1.

The data carrier 1 and the circuit 2 are designed so that, at the occurrence of two representative values REP1 and REP2 each representing a high field strength of the field acting on the data carrier 1, the onset points for the time windows TW—in which the data carrier 1 generates a response signal RS, which is then transmitted to the communication station as a transmission signal MCRS—are so defined that such transmission occurs only during the first thirty-two (32) possible time windows TW. If, on the other hand, the two representative values REP1 and REP2 represent a weak field strength of the field acting on the data carrier 1, the result will be that transmission occurs in the data carrier 1 or the circuit 2 only during the second thirty-two (32) time windows TW. This ensures by simple means that data carriers 1 which are exposed to varying field strength values always transmit their response signals to the communication station in different time windows, so that any unwanted masking of a weak response signal from a data carrier by a strong response signal from another data carrier is prevented, and consequently a flawless detection of all data carriers present in the communication range of the communication station is assured at all times.

Figure 2:
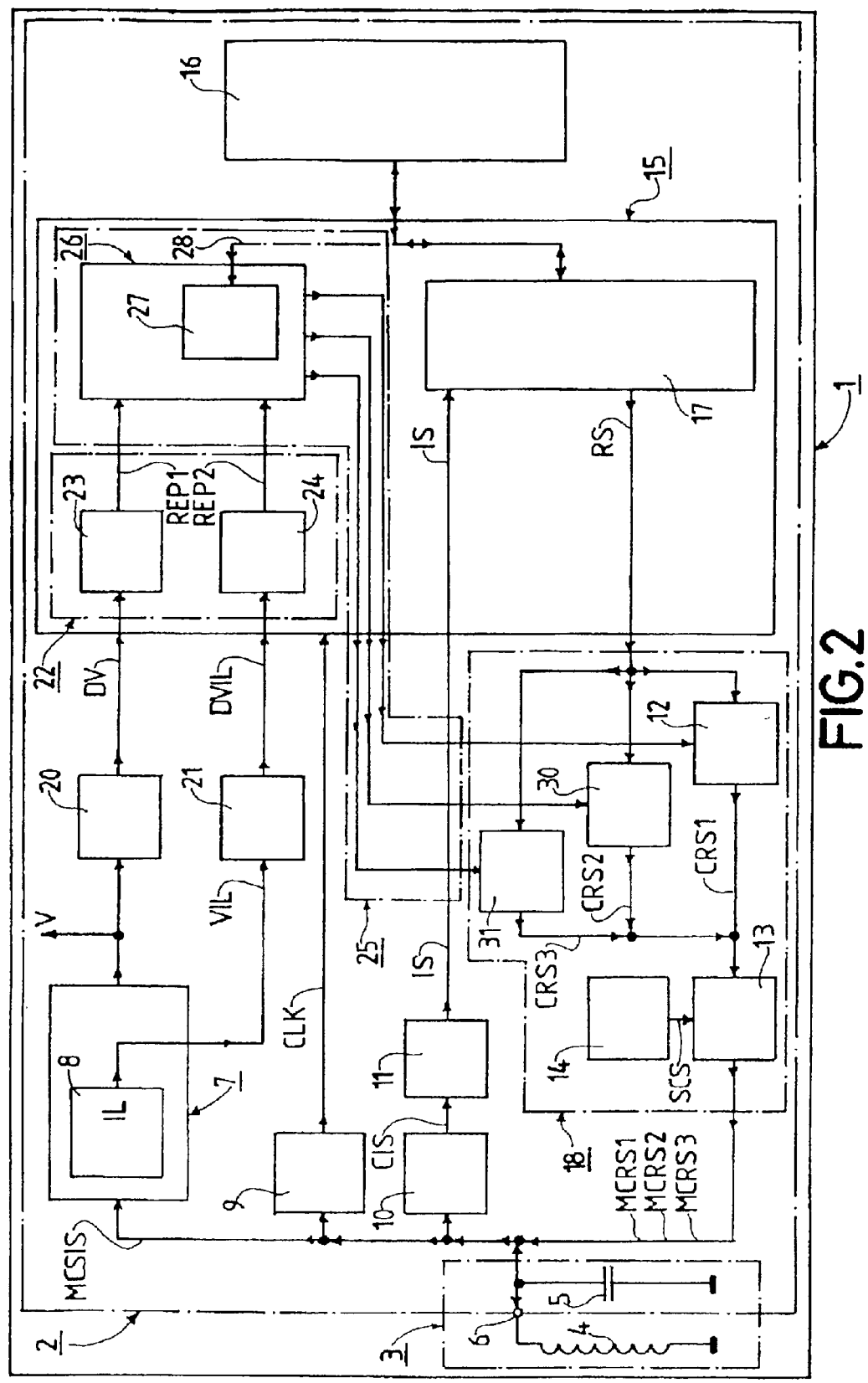
FIG. 2 in a similar way to FIG. 1 shows what is, in this context, an essential part of a data carrier and a circuit for said data carrier in a second embodiment of the invention.

The data carrier 1 and the circuit 2 of FIG. 2 are of largely the same design as the data carrier 1 and the circuit 2 of FIG. 1. However, a different design has been chosen for the processing means 18 in the data carrier 1 of FIG. 2.

In the data carrier 1 and the circuit 2 of FIG. 2, the processing means 18 have a second coding stage 30 and a third coding stage 31 in addition to the first coding stage 12. With the three coding stages 12, 30, and 31, three different methods of coding are possible. The processing means 18 are therefore in this case designed to process the response signal RS with three different methods of coding. It is also possible, however, to provide just two, or even four or more coding stages. The methods of coding possible with the three coding stages 12, 30, and 31 differ from one another in that each method of coding has a different assignment of specific, successive signal sequences to a specific logic bit (one or zero). The fact that specific successive signal sequences are assigned to a specific logic bit has long been known in the art as the "spread spectrum" transmission method.

The three coding stages 12, 30, and 31 can be controlled by the control connection means 25 as a function of the two representative values REP1 and REP2, which can be determined by the determination means 22. In this case the control means 26 can activate a coding stage 12 or 30 or 31 as a function of each of the two representative values REP1 and REP2, so that a method of coding can be performed in each case. The respective coding stage 12 or 30 or 31 activated delivers the coded response signal CRS1 or CRS2 or CRS3 generated thereby to the modulation stage 13. The modulation stage 13 subsequently delivers the respective modulated and coded response signal MCRS1 or MCRS2 or MCRS3 to the transmission means 3 for transmission to a communication station.

The data carrier 1 and the circuit 2 of FIG. 2 therefore allow the coding stage 12 or 30 or 31 activated at any one time to be activated as a function of the two representative values REP1 and REP2, so that the coding stage 12 or 30 or 31 activated at any one time, and consequently the method of coding performed at any one time, will depend on the value of the field strength acting on the data carrier 1. This ensures that data carriers 1 exposed to different field strengths transmit their response signals to a communication station with different methods of coding and that the communication station can consequently distinguish between them on the basis of the different methods of coding, so that they can be flawlessly detected.

Figure 3:
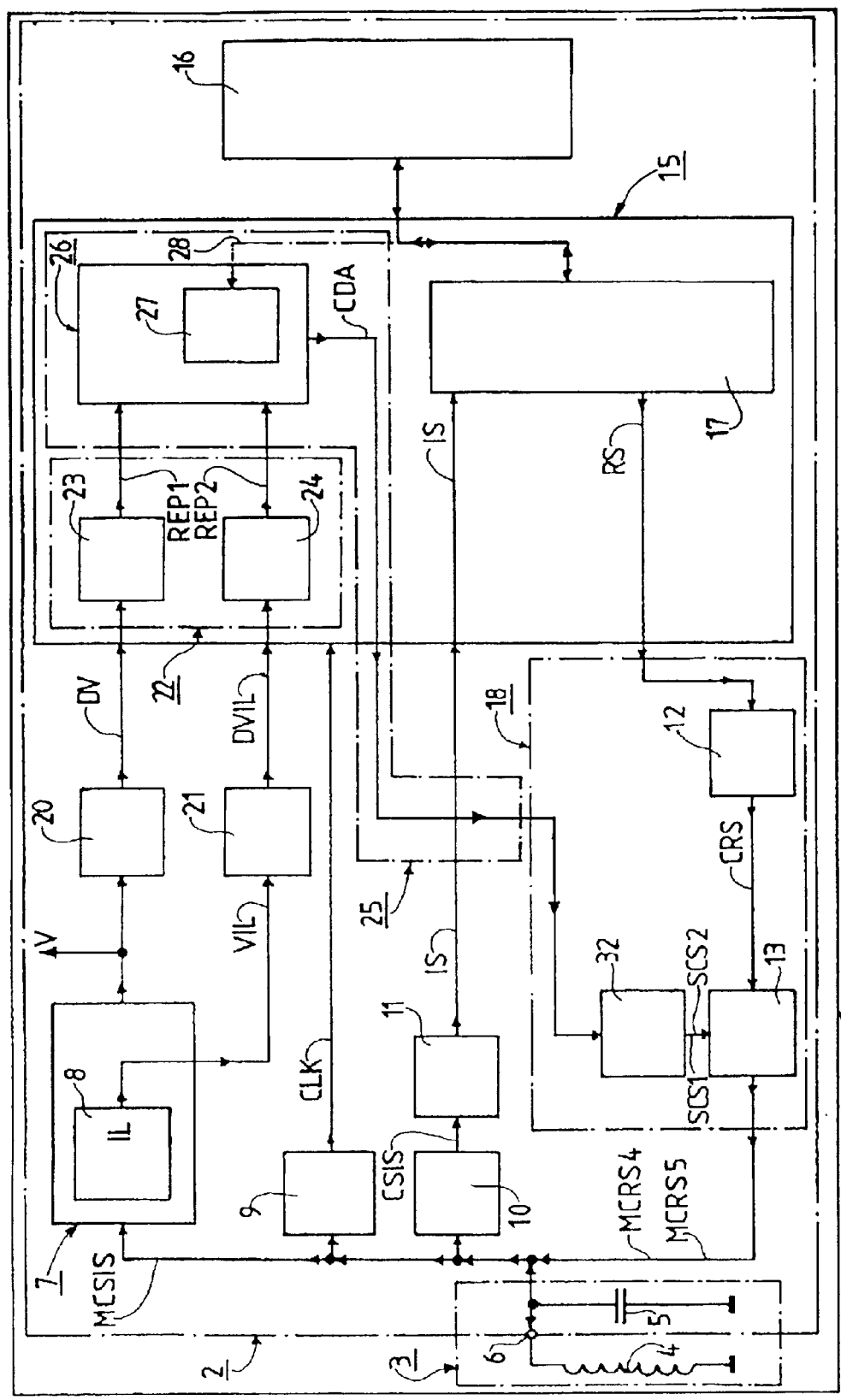
FIG. 3 in a similar way to FIGS. 1 and 2 shows what is, in this context, an essential part of a data carrier and a circuit for said data carrier in a third embodiment of the invention.

The data carrier 1 and the circuit 2 of FIG. 3 involve a further design variant of the processing means 18. In this case the processing means 18 are designed to process the response signal RS with two different subcarrier signals SCS1 and SCS2. However, the processing means 18 may also be designed to process the response signal RS with more than two different subcarrier signals SCS1 and SCS2, for example with three or four subcarrier signals. The response signal RS can be modulated by means of the two subcarrier signals SCS1 and SCS2. The two different subcarrier signals SCS1 and SCS2 differ from one another in their frequency, that is in the subcarrier frequency. For generating the two subcarrier signals SCS1 and SCS2, subcarrier signal generating means 32 are provided, which take the form of a subcarrier signal generator of switchable frequency, to which control data CDA from the control means 26 can be fed, it being possible to switch over the frequency of the subcarrier signal generator as a function of the control data CDA delivered. The control data CDA are generated in a way similar to that in the data carriers 1 FIGS. 1 and 2 as a function of the two representative values REP1 and REP2 and as a function of a random number generated by the random number generator 27. The two subcarrier signals SCS1 and SCS2 of different frequency can therefore be generated by the subcarrier signal generating means 32 as a function of the two representative values REP1 and REP2.

The data carrier 1 and the circuit 2 of FIG. 3 thus ensure that the modulation stage 13 delivers different modulation results for different field strengths acting on the data carrier 1, with the result that differently modulated transmission signals MCRS4 or MCRS5 can be transmitted from the data carrier 1 to a communication station, and data carriers which are exposed to different field strengths and consequently respond with differently modulated transmission signals can be flawlessly distinguished and consequently flawlessly detected, because any masking effect is avoided, as was explained above, because data carriers exposed to different field strengths respond to a communication station with differently modulated transmission signals MCRS4 or MCRS5.

With the data carriers 1 and circuits 2 described above, two representative values REP1 and REP2 are formed in each instance. This need not necessarily be the case, since solutions are also possible in which only one representative value is formed, i.e. either the representative value REP1 or the representative value REP2. If necessary, however, more than two representative values, for example three or four representative values, may be formed.

It should be mentioned that a combination is also possible in which time slots are defined as a function of a random number generator, and a different transmission parameter, for example the subcarrier frequency of a subcarrier signal, is made to vary as a function of the field strength acting on a data carrier 1.

Figure 4:
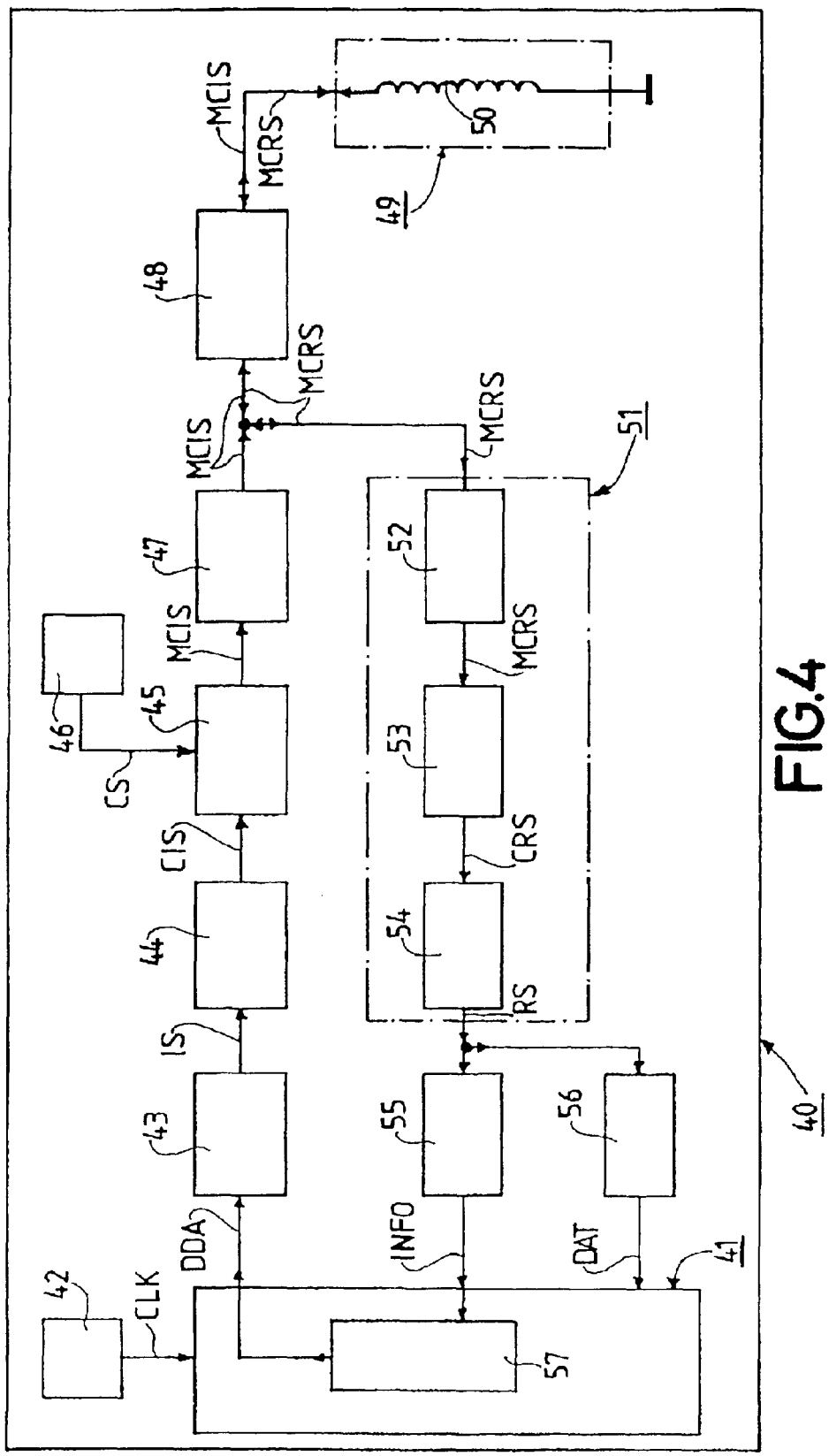
FIG. 4 is a schematic representation in the form of a block circuit diagram of what is, in this context, an essential part of a communication station in an embodiment of the invention.

FIG. 4 shows a communication station 40. The communication station 40 is intended and designed for contactless communication with a data carrier 1 according to FIG. 1. That is to say the communication station 40 is designed for contactless communication with data carriers in which a transmission signal is transmitted to the communication station 40 in different time windows.

The communication station 40 comprises sequence control means 41, which in this instance are provided by a microcomputer. The sequence control means 41 may take the form, however, of a hard-wired logic circuit. A clock signal generator 42, which delivers a clock signal CLK to the sequence control means 41, is connected to the sequence control means 41.

Command signal generating means 43 are connected to the sequence control means 41. The command signal generating means 43 are capable of generating a plurality of command signals, for example an interrogation signal, a select signal, a read command signal, a write command signal, and a number of other command signals. In FIG. 4 the interrogation signal IS is made to represent all command signals.

Coding means 44, which serve to subject a delivered command signal to coding, are connected to the output side of the command signal generating means 43. After coding, the coding means 44 produce a coded command signal, for example a coded interrogation signal CIS. Connected to the coding means 44 on the output side are modulation means 45 to which a coded command signal, for example a coded interrogation signal CIS, can be fed and to which, in addition, a carrier signal CS generated by a carrier signal generator 46 can also be fed. The modulation means 45 are capable of modulating the supplied carrier signal CS as a function of the likewise supplied coded command signal, so that after modulation the modulation means 45 can deliver a modulated coded command signal, for example a modulated coded interrogation signal MCIS. Connected to the output side of the modulation means 45 are amplifying means 47 which are capable of amplifying a modulated coded command signal. Connected to the output side of the amplifying means 47 are adapter means 48, to the output side of which transmission means 49 are connected which comprises a transmission coil 50 and which operate both as transmitter means and as reception means. A modulated coded command signal amplified by the amplifying means 47 is fed via the adapter means 48 to the transmission means 49 for transmission to all data carriers 1 according to FIG. 1 present in a communication range of the communication station 40.

The circuit elements hitherto described serve to transmit signals from the communication station 40 to the data carrier 1 of FIG. 1. Also provided in the communication station 40 are means which operate when a transmission signal is transmitted from a data carrier 1 of FIG. 1 to the communication station 40. These means also include the transmission means 49 and the adapter means 48.

These means furthermore include processing means 51 capable of processing a transmission signal, for example a modulated coded response signal MCRS, transmitted from a data carrier 1 according to FIG. 1 to the communication station 40. The processing means 51 comprise filter means 52 connected to the adapter means 48, and connected to the output side of the filter means 52 are demodulation means 53, with decoding means 54 connected to the output side of the demodulation means 53. After the respective transmission signal has been filtered by the filter means 52, it is demodulated by the demodulation means 53 and then decoded by the decoding means 54, so that in the case of a modulated coded response signal MCRS transmitted to the communication station 40, a coded response signal CRS emerges from the demodulation means 53 and the response signal RS emerges from the decoding means 54.

Connected to the output side of the processing means 51 are transmission parameter detection means 55 and transmission signal detection means 56. In this instance the transmission parameter detection means 55 are time window detection means, which can detect in which time window TWn of a total of sixty-four (64) possible time windows TW, each beginning at different times, a transmission signal, for example a response signal RS transmitted to the communication station 40, was transmitted.

The transmission signal detection means 56 are intended and designed to detect the content of a transmission signal. For example, the transmission signal detection means 56 can detect the content of a response signal RS. This content may be the serial number of a data carrier 1, for example, and also data stored in the data carrier 1 which, for example, represent a product type, a product price, a date of manufacture, and similar characteristics. The data DAT detected by the transmission signal detection means 56 are fed to the sequence control means 41 and, controlled by the sequence control means 41, are relayed for further processing, here being fed, for example, to a so-called host computer.

The transmission parameter detection means 55 are designed to generate information data INFO, the information data INFO in each case representing that transmission parameter which is characteristic of the particular transmission signal received, which in this case therefore is characteristic of that time window in which a transmission signal was transmitted from a data carrier 1 to the communication station 40. It should be noted here that the respective time window, in which a transmission signal was transmitted from the data carrier 1 of FIG. 1 to the communication station 40, depends on the field strength acting on the data carrier 1 of FIG. 1, the value for the field strength varying as a function of the distance of the data carrier 1 from the communication station 40.

The information data INFO generated by the transmission parameter detection means 55 can be fed to the sequence control means 41. The sequence control means 41 comprise decision means 57 which are advantageously provided between the transmission parameter detection means 55 and the command signal generating means 43. The decision means 57 are designed so that they generate decision data DDA as a function of information data INFO received from the transmission parameter detection means 55, which decision data DDA can be fed to the command signal generating means 43. The decision data DDA can be used for signaling to the command signal generating means 43 which command signals from the total set of command signals that can be generated may be generated by the command signal generating means 43. This affords the advantage that the command signal generating means 43 receive permission for the generation of specific command signals from the decision means 57. Since the information data INFO delivered to the decision means 57 are dependent upon the transmission parameter detected at any one time, i.e. in this case on the time window detected at any one time, and consequently on the value of the field strength that has been acting on the data carrier which has transmitted a specific transmission signal to the communication station 40, this means that the command signal generating means 43 generate only those command signals that can be meaningfully transmitted to the said data carrier. For example, this will mean that no write command signal is transmitted to a data carrier 1 which is relatively far away from the communication station 40 and on which therefore only a low field strength is acting, because performing such a writing process activated by such a write command signal requires a relatively high power which, however, is in all probability not available to a data carrier 1 situated relatively far away from the communication station 40, so that a flawless writing process is not assured.

In a communication station for contactless communication with a data carrier 1 according to FIG. 2, this communication station not being shown, transmission parameter detection means and transmission signal detection means are likewise provided, the transmission parameter detection means, however, being designed to detect the method of coding with which a transmission signal was transmitted from the data carrier 1 of FIG. 2 to the communication station. It is also intended in this case that the transmission parameter detection means should interact with the transmission signal detection means such that the transmission parameter detection means deliver control information to the transmission signal detecting means once the transmission parameter detection means have detected with what transmission parameter a transmission signal has been transmitted to the communication station, so that by using this control information the transmission signal detection means can flawlessly detect a transmission signal transmitted to the communication station.

In a communication station, likewise not shown, for contactless communication with a data carrier 1 according to FIG. 3, transmission parameter detection means and transmission signal detection means are again provided, the transmission parameter detection means being designed, however, to detect the subcarrier frequency used for the modulated transmission signal and the modulated coded transmission signal consequently being fed to the transmission parameter detection means, and the transmission parameter detection exerting an influence on the demodulation means in the processing means so as to be able to ensure a flawless demodulation of the modulated coded transmission signal in accordance with the modulation conditions detected.

In the case of the data carriers 1 and circuits 2 of FIGS. 2 and 3 described above, the interrogation signals IS, suitably amplitude-modulated and coded, are transmitted from a communication station to the relevant data carrier 1, resulting in the immediate generation of a response signal RS in the data carrier 1. Both the interrogation signal IS and the response signal RS take the form of data words of a predetermined word length. It is also possible, however, for the interrogation signal to take the form of an unmodulated initiating signal generated by the communication station, the initiating signal essentially being a sinusoidal signal with no information content and the initiating signal being emitted by the communication station using its transmission means in a communication range of the communication station and being received by the transmission means of a data carrier entering the communication range of the communication station, so that the data carrier in question is supplied with power and the generation of a response signal is automatically triggered by the generating means of the data carrier.

What is claimed is:

1. A data carrier (1) for contactless communication with a communication station, the data carrier (1) comprising the means listed below:

reception means (3) for receiving an interrogation signal (IS), which interrogation signal (IS) can be generated by a communication station and can be transmitted to the data carrier (1) in a contactless manner by a field produced by the communication station and acting on the data carrier (1), and generating means (17) for generating a response signal (RS) upon reception of the interrogation signal (IS) and processing means (18) for processing the response signal (RS), the processing means (18) being designed to process the response signal (RS) into a transmission signal (MCRS; MCRS1, MCRS2, MCRS3; MCRS4, MCRS5) suitable for transmission to the communication station, in which processing means (18) at least one transmission parameter of the transmission signal (MCRS, MCRS1, MCRS2, MCRS3; MCRS4, MCRS5) can be varied, and determination means (22) for determinating at least one representative value (REP1, REP2), the representative value (REP1, REP2) representing the field strength of the field acting on the data carrier (1), and control connection means (25) between the determination means (22) and the processing means (18), the control connection means (25) being designed to controllably influence the processing means (18) as a function of the at least one representative value (REP1, REP2), used to vary at least one transmission parameter of the transmission signal (MCRS; MCRS1, MCRS2, MCRS3; MCRS4, MCRS5) as a function of the at least one representative value (REP1, REP2).

2. A data carrier (1) as claimed in claim 1, wherein control means (26), which interact with the determination means (22), which are designed to generate control data (CDA) as a function of the at least one representative value (REP1, REP2), and which interact with the processing means (18) in order to vary the at least one transmission parameter of the transmission signal (MCRS; MCRS1, MCRS2, MCRS3; MCRS4, MCRS5) by means of the control data generated, are provided in the control connection means (25).

3. A data carrier (1) as claimed in claim 1, wherein the processing means (18) being designed for processing the response signal (RS) in at least two time windows beginning at different onset points, and wherein the processing means (18) for this purpose comprising time window defining means (19) capable of defining at least two different onset points for time windows as a function of the at least one representative value (REP1, REP2).

4. A data carrier (1) as claimed in claim 1, wherein the processing means (18) being designed for processing the response signal (RS) with at least two different methods of coding, and wherein the processing means (18) for this purpose comprising at least two coding stages (12, 30, 31) designed to perform different methods of coding, said coding stages being capable of performing at least two different methods of coding as a function of the at least one representative value (REP1, REP2).

5. A data carrier (1) as claimed in claim 1, wherein the processing means (18) being designed for processing the response signal (RS) with at least two different subcarrier signals (SCS1, SCS2) capable of modulating the response signal (RS), and wherein the processing means (18) for this purpose comprising subcarrier signal generating means (32) capable of generating at least two different subcarrier signals (SCS1, SCS2) as a function of the at least one representative value (REP1, REP2).

6. A circuit (2) for a data carrier (1) for contactless communication with a communication station, the circuit (2) comprising the means listed below:

connection means (6) for receiving an interrogation signal (IS), which interrogation signal (IS) can be generated by a communication station and can be transmitted to the data carrier (1) and hence to the circuit (2) for the data carrier (1) in a contactless manner by a field produced by the communication station and acting on a data carrier (1), and generating means (17) for generating a response signal (RS) upon reception of the interrogation signal (IS), and processing means (18) for processing the response signal (RS), the processing means (18) being designed to process the response signal (RS) into a transmission signal (MCRS, MCRS1, MCRS2, MCRS3, MCRS4, MCRS5) suitable for transmission to the communication station, in which processing means (18) at least one transmission parameter of the transmission signal (MCRS; MCRS1, MCRS2, MCRS3; MCRS4, MCRS5) can be varied, and determination means (22) for determinating at least one representative value (REP1, REP2), the representative value (REP1, REP2) representing the field strength of the field acting on the data carrier (1), and control connection means (25) between the determination means (22) and the processing means (18), the control connection means (25) being designed to controllably influence the processing means (18) as a function of the at least one representative value (REP1, REP2), i.e. to vary at least one transmission parameter for the transmission signal (MCRS; MCRS1, MCRS2, MCRS3; MCRS4, MCRS5) as a function of the at least one representative value (REP1, REP2).

7. A circuit (2) as claimed in claim 6, wherein control means (26), which interact with the determination means (22), which are designed to generate control data (CDA) as a function of the at least one representative value (REP1, REP2), and which interact with the processing means (18) in order to vary the at least one transmission parameter of the transmission signal (MCRS; MCRS1, MCRS2, MCRS3; MCRS4, MCRS5) by means of the control data generated, are provided in the control connection means (25).

8. A circuit (2) as claimed in claim 6, wherein the processing means (18) being designed for processing the response signal (RS) in at least two time windows beginning at different onset points, and wherein the processing means (18) for this purpose comprising time window defining means (19) capable of defining at least two different onset points for time windows as a function of the at least one representative value (REP1, REP2).

9. A circuit (2) as claimed in claim 6, wherein the processing means (18) being designed for processing the response signal (RS) with at least two different methods of coding, and wherein the processing means (18) for this purpose comprising at least two coding stages (12, 30, 31) designed to perform different methods of coding, said coding stages being capable of performing at least two different methods of coding as a function of the at least one representative value (REP1, REP2).

10. A circuit (2) as claimed in claim 6, wherein the processing means (18) being designed for processing the response signal (RS) with at least two different subcarrier signals (SCS1, SCS2) capable of modulating the response signal (RS), and wherein the processing means (18) for this purpose comprising subcarrier signal generating means (32) capable of generating at least two different subcarrier signals (SCS1, SCS2) as a function of the at least one representative value (REP1, REP2).

11. A communication station (40) for contactless communication with a data carrier (1), the data carrier (1) being designed for contactless communication with the communication station and comprising the following means: reception means (3) for receiving an interrogation signal (IS), which interrogation signal (IS) can be generated by the communication station and can be transmitted to the data carrier (1) in a contactless manner by a field produced by the communication station and acting on the data carrier (1), and generating means (17) for generating a response signal (RS) upon reception of the interrogation signal (IS) and processing means (18) for processing the response signal (RS) the processing means (18) being designed to process the response signal (RS) into a transmission signal suitable for transmission to the communication station(MCRS), in which processing means (18) at least one transmission parameter of the transmission signal (MCRS) can be varied, and determination means (22) for determinating at least one representative value (REP1, REP2), the representative value (REP1, REP2) representing the field strength of the field acting on the data carrier (1), and control connection means (25) between the determination means (22) and the processing means (18), the control connection means (25) being designed to controllably influence the processing means (18) as a function of the at least one representative value (REP1, REP2), used to vary the at least one transmission parameter of the transmission signal (MCRS) as a function of the at least one representative value (REP1, REP2), wherein the communication station (40) comprising the following means:

command signal generating means (43) for generating command signals (IS) and reception means (49) for receiving the transmission signal (MCRS) transmitted from the data carrier (1) to the communication station (40), and processing means (51) for processing the transmission signal received (MCRS), and transmission parameter detection means (55) for detecting the transmission parameter of the transmission signal received (MCRS), and decision means (57) which interact with the transmission parameter detection means (55) and which are intended and designed to decide on the generation of at least one command signal as a function of the transmission parameter of the received transmission signal (MCRS) detected by the transmission parameter detection means (55).

12. A communication station (40) as claimed in claim 11, wherein the decision means (57) are provided between the transmission parameter detection means (55) and the command signal generating means (43) and are designed to influence the command signal generating means (43) as a function of the transmission parameter of the received transmission signal (MCRS) detected by the transmission parameter detection means (55), having regard to which command signals are allowed to be generated by the command signal generating means (43).

* * * * *